INVENTOR:
FRIEDRICH BÖCKER

United States Patent Office 3,517,793
Patented June 30, 1970

3,517,793
TRANSPORTING ARRANGEMENT FOR TRANSPORTING BOTTLES OR THE LIKE AWAY FROM A BOTTLE-CLEANING MACHINE
Friedrich Böcker, Massen, Germany, assignor to Holstein & Kappert Maschinenfabrik Phonix G.m.b.H., Dortmund, Germany
Filed Jan. 2, 1968, Ser. No. 695,090
Claims priority, application Germany, Dec. 30, 1966, H 61,440
Int. Cl. B65g 47/00
U.S. Cl. 198—25     6 Claims

ABSTRACT OF THE DISCLOSURE

A transporting arrangement for transporting bottles or the like from the discharge end of a bottle-cleaning machine away from the latter in direction of the longitudinal axis of the machine, in which the bottles leaving the discharge end are guided in downward direction onto a combined receiving and transfer means which receives the bottles and automatically transfers the latter onto an elongated conveyor extending in direction of said axis laterally and downwardly spaced from the discharge end of the machine.

BACKGROUND OF THE INVENTION

The present invention relates to a transporting arrangement for transporting bottles or the like away from a bottle-cleaning machine in which the bottles arranged in bottle compartments of the machine are moved past the discharge end of the latter to be discharged and guided from the bottle compartments in downward direction onto a receiving surface, from where the bottles are transported by a conveyor extending in direction of the longitudinal axis of the machine away from the latter.

Transporting arrangements of this kind are especially suitable for fast moving bottle-cleaning machines with a high output, in that such transporting arrangements in which the bottles are transported away from the machine in direction of the longitudinal axis of the latter permit the bottles to be transported away in quick succession, as is not possible in transporting arrangements in which the bottles are transported in direction transverse to the longitudinal axis of the machine.

Transporting arrangements in which the bottles are transported away in direction of the longitudinal axis of the machine have already been suggested and in known transporting arrangements of the aforementioned kind, the bottles discharged from the discharge end of the machine are first placed on a receiving surface at which the bottles are engaged by pusher means which push the bottles along the receiving surface in transverse direction onto an elongated conveyor extending in direction of the longitudinal axis of the bottle cleaning machine. Such known transporting arrangements are however complicated and in addition are liable to topple the bottles as they are pushed from the receiving surface onto the elongated conveyor.

It is an object of the present invention to provide for a transporting arrangement of the aforementioned kind which is simpler than the transporting arrangements of this kind known in the art.

It is an additional object of the present invention to provide for a transporting arrangement of the aforementioned kind in which toppling of the bottles while they are transported from the guide means to the elongated conveyor is substantially prevented.

It is a further object of the present invention to provide for a transporting arrangement of the aforementioned kind which is composed of relatively few and simple parts so that the arrangement may be constructed at reasonable cost and will act trouble-free during extended use.

SUMMARY OF THE INVENTION

With these objects in view, the transporting arrangement according to the present invention for transporting bottles or the like from the discharge end of a bottle-cleaning machine in direction of the longitudinal axis of the machine away from the latter, mainly comprises elongated conveyor means extending laterally and at an elevation downwardly spaced from the discharge end substantially in direction of the longitudinal axis of the machine, guide means extending downwardly from the discharge end to the aforementioned elevation, and combined receiving and transfer means for receiving bottles from the guide means and for automatically transferring the bottles onto the elongated conveyor means.

The combined receiving and transfer means according to the present invention may comprise a grate having a plurality of stationary, substantially parallel bars extending between the guide means and the conveyor means transverse to the latter, and having upper receiving faces adapted to receive bottles guided in downward direction by the guide means, and a plurality of movable bars arranged between the latter substantially parallel thereto and having upper transfer faces. The movable bars are movable from a first position, in which one of the ends of the movable bars are adjacent the guide means and the transfer faces thereof are below the receiving faces of the stationary bars, upwardly and forwardly toward the conveyor means to a second position, in which the one ends of the movable bars are closer to the conveyor means than in the first position and the transfer faces are upwardly spaced from the receiving faces, and then from said second position downwardly and rearwardly back to the first position, whereby the bottles are stepwisely moved from the guide means toward the conveyor means.

In a preferred construction according to the present invention, the guide means may also include movable control means adapted to engage bottles discharged from the discharge means and controlling the movement thereof in downward direction onto the combined receiving and transfer means. The aforementioned control means are preferably formed by a plurality of rotating cam discs arranged in part between the bars of the grate and the arrangement preferably includes also means for synchronizing the movement of the rotating cam discs and the movement of the movable bars of the combined receiving and transfer means in such a manner that successive bottles moving downwardly on the guide means will engage the receiving faces of the stationary bars while the transfer faces of the movable bars are at an elevation below that of the receiving faces of the stationary bars.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
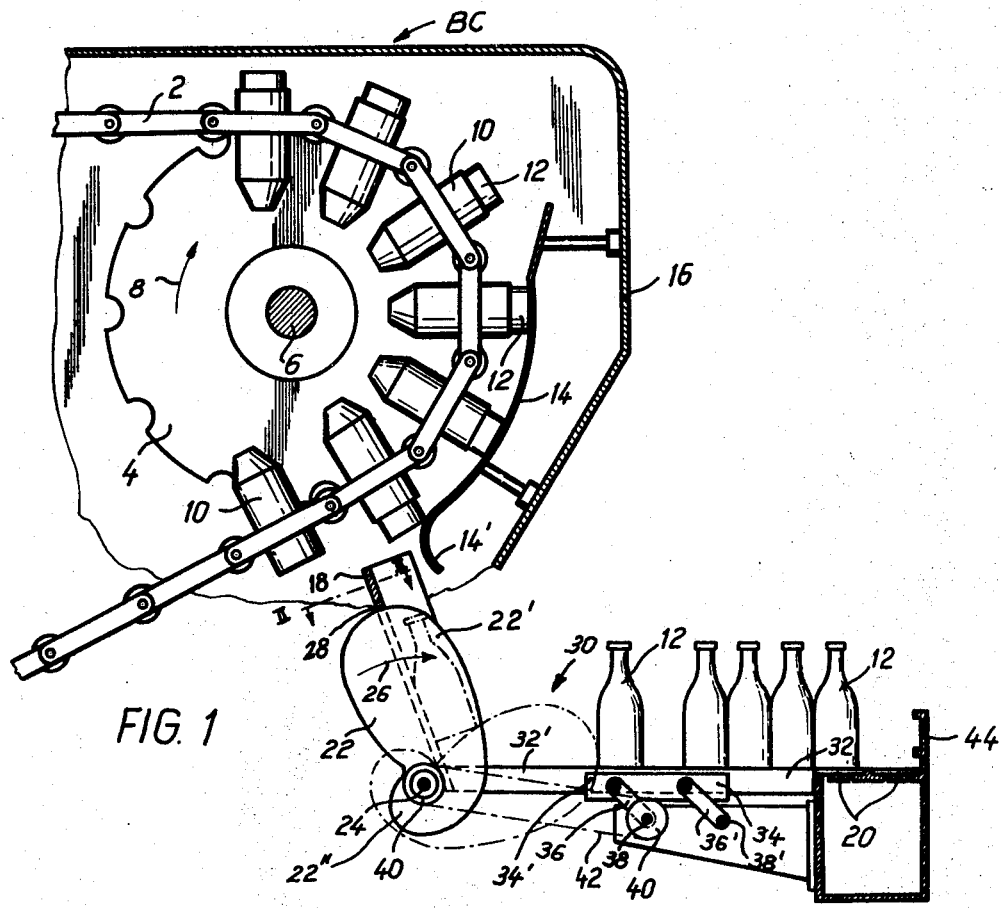
FIG. 1 is a schematic cross-sectional side view of the transporting arrangement according to the present invention and showing also part of the bottle-cleaning machine at the discharge end thereof.

FIG. 1 schematically illustrates part of a bottle-cleaning machine BC of known construction in the region of the discharge end thereof. The bottle-cleaning machine BC shown in FIG. 1 may include a plurality of substantially parallel conveyor chains 2, only the front one of which is shown in FIG. 1, which are guided over corresponding sprocket wheels 4 which in turn are mounted on a shaft 6 extending in longitudinal direction of the machine and driven by means not shown in the drawing to rotate the sprocket wheels in direction of the arrow 8. The links of the sprocket chains 2 carry between themselves rows of bottle compartments 10 of known construction, not forming part of the present invention, and only the front compartment of each row being shown in the drawing. Each of the bottle compartments receives, at a receiving station, not shown in the drawing, a bottle 12 therein and the bottles are carried by the bottle compartments 10 through a plurality of cleaning stations, not shown in the drawing, in which the bottles are cleaned, and from the cleaning stations the bottle compartments 10 with the clean bottles therein are moved by the conveyor chains 2 to the discharge end D of the bottle-cleaning machine. Each of the bottle compartments 10 has an open end facing, during passage of the conveyor chains 2 about the sprocket wheels 4, away from the axis of the shaft 6 and the bottles 12 extend with the closed rear ends thereof preferably slightly beyond the open ends of the bottle compartments 10 to engage with their bottom faces a curved guide 14 of sheet metal or the like extending with a major portion thereof substantially concentric to the periphery of the sprocket wheels 4 and mounted in any convenient manner in the housing 16 of the bottle-cleaning machine. The sheet metal guide 14 has at the discharge end D of the bottle-cleaning machine a downwardly curved guide portion 14' so that the bottles 12 in the bottle compartments 10 may slide downwardly from the latter onto the guide means of the transporting arrangement according to the present invention.

Figure 2:
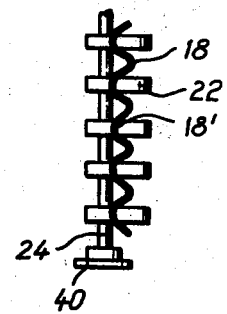
FIG. 2 is a cross-section taken along the line II—II of FIG. 1.

The guide means preferably comprise a stationary guide member 18, which is preferably in the form of an undulated sheet metal member, as best shown in FIG. 2, forming a plurality of grooves 18' adapted to receive respectively the bottles from the respective row of bottle-cleaning compartments 10 and extending downwardly from the discharge end D of the bottle-cleaning machine to the elevation of an elongated band or chain conveyor 20 extending laterally and downwardly spaced from the discharge end D of the bottle-cleaning machine substantially in the direction of the axis of the shaft 6. The guide means according to the present invention preferably include also control means for controlling the speed at which the bottles move downwardly along the stationary guide member 18, and the control means preferably include a plurality of cam discs 22 having substantially a shape as shown in FIG. 1 and mounted on a shaft 24 for rotation therewith in clockwise direction, as indicated by the arrow 26, through longitudinal slots 28 formed in the lower portion of the stationary guide member 18. The bottles 12 leaving the bottle compartments 10 as the latter are passed by the discharge end D of the machine engage, in the position as shown in dash-dotted lines in FIG. 1, the peripheral surfaces 22' of the cam discs 22 to move, during rotation of the cam disc in direction of the arrow 26, in a controlled manner downwardly and in substantially vertical position onto the combined receiving and transfer means 30 which extend between the guide means 18, 22 and the elongated conveyor 20 of the transporting arrangement.

The combined receiving and transfer means 30 according to the present invention preferably comprise a grate having a plurality of stationary bars 32 extending substantially parallel and spaced from each other between the lower end of the guide member 18 and the elongated conveyor means 20, and a plurality of movable bars 34, preferably shorter than the stationary bars 32 and respectively arranged between the stationary bars substantially parallel thereto. The movable bars are movable parallel to themselves from a first position, as shown in full lines in FIG. 1, in which the upper transfer faces 34' of the movable bars 34 are located below the upper receiving faces 32' of the stationary bars 32 and in which the left ends, as viewed in FIG. 1, of the transfer faces 34' are located in the region of the lower end of the guide member 18, upwardly and forwardly toward the elongated conveyor means 20 to a second position, as shown in dash-dotted lines in FIG. 1, in which the transfer faces 34' are slightly above the receiving faces 32' and from the second position again downwardly and rearwardly back to the first position.

Mounting means are provided which mount the movable bars 34 for movement between the aforementioned positions thereof, and these mounting means may include a pair of arms 36 and 36' extending spaced and substantially parallel to each other and pivotally connected at upper ends thereof to longitudinally spaced portions of a corresponding movable bar 34, whereas the lower ends of the arms are respectively fixed to a pair of shafts 38 and 38' extending parallel to the shaft 24 and rotatably supported in any convenient manner on the frame of the bottle-cleaning machine.

The transporting arrangement according to the present invention preferably includes also means for synchronizing the movement of the control means, that is the cam discs 22, and the movement of the movable bars 34 in such a manner that the bottles moving downwardly on the peripheral face 22' of the cam discs 22 are placed on the receiving faces 32' of the stationary bars 32 of the grate adjacent to the bottom end of the stationary guide member 18 while the transfer faces of the movable bars 34 are at an elevation below that of the receiving faces of the stationary bars 32. The synchronizing means may include a pair of sprocket wheels 40 mounted on the shafts 24 and 38 for rotation therewith and a sprocket chain 42 wound about the two sprocket wheels 40. One of the shafts 24 or 38 is rotated about its axis by drive means, not shown in the drawing, and such drive means may include a step-down transmission between shaft 6 and either shaft 24 or 38 so that the cam discs 22 will make a full revolution while one row of bottle compartments passes the discharge end of the machine.

The above-described transporting arrangement will operate as follows:

The bottles 12 transported in the bottle compartments 10 will slide in downward direction out of the bottle compartments when the latter pass the discharge end D of the bottle-cleaning machine, and the bottoms of the bottles 12 will be engaged by the peripheral cam faces 22' of the cam discs 22, rotating in direction of the arrow 26, to be guided in downward direction along the stationary guide member 18 and to be placed in substantially vertical position on the upper receiving faces 32' of the stationary bars 32, while the transfer faces 34' of the movable bars 34 at at an elevation below that of the receiving faces. While the cam discs 22 move through the spaces between bars of the grate and back to the position as shown in FIG. 1. Their segments 22" push the bottles 12, just positioned on the upper receiving faces 32', to the right. During engagement of the next load of bottles 12 discharged from the compartments 10, the segments 22' of the cam discs 22 push the previously discharged bottles 12 further to the right, so that these bottles arrive at a position above the transfer faces 34' just being below the receiving faces 32'. The movable bars move from the first position toward the second position and then again downwardly and rearwardly to the first position so that the bottles are engaged at the bottom faces thereof by the transfer faces 34' and lifted slightly above the receiving faces 32' and are moved towards the right, as viewed in FIG. 1, and so that the bottles, as the transfer faces 34' of the movable bars move again downwardly below the elevation of the receiving faces 32', are placed onto the receiving faces 32' at a position closer to the elongated conveyor means 20 than in the position in which they have been first engaged by the transfer faces 34'. During the next cycle of movement of the movable bars, the bottles placed during the preceding cycle by the movable bars onto the receiving faces 32' of the stationary bars will be moved further towards the right, as viewed in FIG. 1, so that the bottles will be gradually shifted onto the elongated conveyor 20. Elongated stop means 44 extending along the right edge, as viewed in FIG. 1, of the elongated conveyor means 20 will prevent the bottles from being pushed beyond the right edge of the conveyor means.

It will be understood that each of the elements described above, or two or more together, may also find a useful application in other types of transporting arrangements for transporting bottles from the discharge end of a bottle-cleaning machine in direction of the longitudinal axis of the latter differing from the types described above.

While the invention has been illustrated and described as embodied in a transporting arrangement for transporting bottles from the discharge end of a bottle-cleaning machine in direction of the longitudinal axis of the latter and including combined receiving and transfer means which receive the bottles discharged in downward direction from the discharge end of the bottle-cleaning machine and automatically transfer the latter onto an elongated conveyor extending in direction of the longitudinal axis of the machine laterally and downwardly spaced from the discharge end of the latter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A transporting arrangement for transporting bottles or the like away from the discharge end of a bottle-cleaning machine having a longitudinal axis in which bottles are discharged from the discharge end in downward direction from successive bottle compartments passed by the discharge end of the machine, said transporting arrangement comprising elongated conveyor means extending laterally and at an elevation downwardly spaced from said discharge end substantially in direction of the longitudinal axis of the machine; guide means extending downwardly from said discharge end to said elevation of said elongated conveyor means for guiding bottles discharged from said discharge end downwardly to said elevation; combined receiving and transfer means for receiving bottles from said guide means and for automatically transferring the bottles onto said elongated conveyor means, said combined receiving and transfer means comprising a grate having a plurality of stationary substantially parallel bars extending transversely spaced from each other between said guide means and said conveyor means in direction transverse to the latter and having upper receiving faces adapted to receive bottles guided in downward direction of said guide means, and a plurality of movable bars arranged between the stationary bars substantially parallel thereto and having upper transfer faces, said movable bars being movable from a first position, in which one of the ends of said movable bars are adjacent said guide means and said transfer faces below said receiving faces, upwardly and forwardly toward said conveyor means to a second position in which said one of the ends of said movable bars are closer to said conveyor means than in said first position and said transfer faces are upwardly spaced from said receiving faces, and from said second position downwardly and rearwardly back to said first position, whereby said bottles are stepwise moved from said guide means towards the conveyor means; mounting means for mounting said movable bars movable parallel to themselves between said positions thereof; movable control means cooperating with said guide means for engaging bottles discharged from said discharge means and controlling the movement thereof in downward direction onto said combined receiving and transfer means; and means for synchronizing the movement of said control means and said movable bars in such a manner that successive bottles moving downwardly on said guide means will engage said receiving faces of said stationary bars while said transfer faces of said movable bars are at an elevation below that of said receiving faces so that the bottles will be received on portions of said receiving recesses adjacent said guide means.

2. A transporting arrangement as defined in claim 1, wherein said control means are formed by rotating cam discs arranged between said bars of said grate.

3. A transporting arrangement as defined in claim 2, wherein said cam discs are rotatable about an axis extending transverse to the elongation of said bars and having peripheral cam faces adapted to engage with portions thereof bottom faces of bottles discharged from said discharge end of said bottle-cleaning machine so as to place during rotation of said cam discs the bottom faces of the bottles onto said receiving faces of said stationary bars.

4. A transporting arrangement as defined in claim 2, wherein said mounting means include a pair of substantially parallel arms for each movable bar pivotally connected at upper ends thereof to longitudinally spaced portions of the respective movable bar and turnably mounted at the lower ends thereof about axes extending substantially normal to the elongation of said bars, and wherein said synchronizing means include connecting means connecting said cam discs with at least one of said arms of each movable bar for simultaneous rotation.

5. A transporting arrangement as defined in claim 4, wherein said cam discs are mounted on a first shaft for rotation therewith and said one arms are mounted on a second shaft substantialy parallel to said first shaft for rotation therewith, and wherein said connecting means comprise a pair of sprocket wheels respectively coaxially fixed to said first and said second shaft and a sprocket chain wound about said sprocket wheels.

6. A transporting arrangement as defined in claim 1, and including elongated stop means extending along said conveyor means at the side thereof distant from said grate.

References Cited

UNITED STATES PATENTS

| | | | |
|---|---|---|---|
| 2,379,571 | 7/1945 | Gerlach | 198—219 |
| 2,497,768 | 2/1950 | Hallead | 198—219 |
| 3,178,005 | 4/1965 | Read | 198—25 |
| 3,305,065 | 2/1967 | Babunovic | 198—25 |

RICHARD E. AEGERTER, Primary Examiner